(12) United States Patent
Zimmer et al.

(10) Patent No.: US 7,930,378 B2
(45) Date of Patent: Apr. 19, 2011

(54) METHOD TO SUPPORT XML-BASED CONSOLES IN PRE-BOOT AND POST OPERATING SYSTEM EXECUTION ENVIRONMENTS

(75) Inventors: Vincent J. Zimmer, Puyallup, WA (US); Michael A. Rothman, Gig Harbour, WA (US)

(73) Assignee: Intel Corporation, Santa Clara, CA (US)

( * ) Notice: Subject to any disclaimer, the term of this patent is extended or adjusted under 35 U.S.C. 154(b) by 2239 days.

(21) Appl. No.: 10/746,533

(22) Filed: Dec. 24, 2003

(65) Prior Publication Data

US 2005/0160159 A1  Jul. 21, 2005

(51) Int. Cl.
*G06F 15/173* (2006.01)
(52) U.S. Cl. .................................... 709/223; 709/204
(58) Field of Classification Search .................. 709/223, 709/204
See application file for complete search history.

(56) References Cited

U.S. PATENT DOCUMENTS

| 5,919,257 | A  | * | 7/1999  | Trostle ............................. 726/22 |
| 6,615,288 | B1 | * | 9/2003  | Herzi ............................... 710/10 |
| 6,978,422 | B1 | * | 12/2005 | Bushe et al. ..................... 715/734 |
| 7,165,170 | B2 | * | 1/2007  | Rothman et al. .................. 713/1 |
| 7,506,051 | B2 | * | 3/2009  | Becker et al. .................... 709/224 |
| 2004/0254978 | A1 | * | 12/2004 | Ibanez et al. .................... 709/203 |
| 2006/0047946 | A1 | * | 3/2006  | Keith, Jr. .......................... 713/2 |

\* cited by examiner

*Primary Examiner* — Jeffrey Pwu
*Assistant Examiner* — Abdelnabi O Musa
(74) *Attorney, Agent, or Firm* — Blakely, Sokoloff, Taylor & Zafman LLP

(57) ABSTRACT

Methods and systems to support XML-based consoles in pre-boot and post OS execution environments. In an embodiment, during pre-boot, XML console in and console out interfaces are loaded, and corresponding API's are published to enable use of the interfaces by various firmware and software components. An XML schema is employed to provide templates for system management console user interface screens and to map various system components to corresponding settings and related data. A system management console host application is run on a remote host or the local system. XML content is passed between the system and the console host application via the XML console interfaces. The XML content is used to generate user interfaces via the console host application and to identify user navigation/menu selection within the user interface screens. The XML console interfaces are also available during OS runtime and OS afterlife, enabling a seamless integration between console appearance during pre-boot, OS runtime, and afterlife.

19 Claims, 13 Drawing Sheets complexType BootHardDiskDrives001Type

| Diagram | BootHardDiskDrives001Type — bios:HardDiskDriveNumber / bios:HardDiskDrive | 1000 |
|---|---|---|
| Namespace | http://developer.intel.com/software/XML/2003/BIOSSchema | 1002 |
| Type | restriction of bios:BootHardDiskDrives001Base | 1004 |
| Children | bios:BootHardDiskDriveNumber BootHardDiskDrive | 1012 |
| Used By | element BootHardDrivers001 | 1006 |
| Attributes | Name   Type   Use   Default   Fixed   Annotation<br>UUID  config:UUID  required<br>alias   xs:string   optional | 1014 |
| Source | `<xs:complexType name="BootHardDiskDrives001Type">`<br>  `<xs:complexContent>`<br>    `<xs:restriction base="bios:BootHardDiskDrives001Base">`<br>      `<xs:sequence>`<br>        `<xs:element ref="bios:HardDiskDriveNumber"/>`<br>        `<xs:element ref="bios:HardDiskDrive"/>`<br>      `</xs:sequence>`<br>    `</xs:restriction>`<br>  `</xs:complexContent>`<br>`</xs:complexType>` | 1010 |

*Fig. 10b* simpleType FloppyConfigurationTypes

| Namespace | http://developer.intel.com/software/XML/2003/BIOSSchema | 1002 |
|---|---|---|
| Type | restriction of xs:string | 1004 |
| Used By | element FloppyAConfiguration | 1006 |
| Facets | enumeration Disabled<br>enumeration 720 KB<br>enumeration 1.44 MB<br>enumeration 2.88 MB | 1016 |
| Source | `<xs:simpleType name="FloppyConfigurationTypes">`<br>  `<xs:restriction base="xs:string"`<br>    `<xs:enumeration vlaue="Disabled"/>`<br>    `<xs:enumeration vlaue="720 KB"/>`<br>    `<xs:enumeration vlaue="1.44 MB"/>`<br>    `<xs:enumeration vlaue="2.88 MB"/>`<br>  `</xs:restriction>`<br>`<xs:simpleType>` | 1010 |

*Fig. 10c*

METHOD TO SUPPORT XML-BASED CONSOLES IN PRE-BOOT AND POST OPERATING SYSTEM EXECUTION ENVIRONMENTS

FIELD OF THE INVENTION

The field of invention relates generally to computer systems and, more specifically but not exclusively relates to techniques for supporting XML—(eXtended Markup Language) based consoles in execution environments under which an operating system (OS) is not available, such as pre-boot and post OS execution environment.

BACKGROUND INFORMATION

The pre-boot phase of a computer system is generally considered to occupy the timeframe between when computer system initialization begins and an operating system begins to boot. Unlike during operating system runtime, there are limited resources available during the pre-boot phase. Similarly, there are no operating system facilities available after an OS as crashed. As a result, the support for interacting with the computer system during pre-boot, and post OS, such as setting policies, gathering information, and viewing configuration information is generally poor, if even available.

Currently, some pre-boot execution environments support Unicode-based console interfaces that provided terse access to the pre-boot environment and related operations. The console interfaces include the ConIn( ) and ConOut( ) functions. These two functions provide rudimentary access to the environment via unicode text input and output, respectively.

One example illustrating a common use of the foregoing text-based functions is the "Setup" application that is available during the early portion of the pre-boot. For example, just after a system restart or reset a user can activate a hot key, such as a function key (F2, F10), Esc, or a key combination to access a limited set of setup configuration parameters. For instance, via a text-based setup screen a user can select I/O port settings, configure a boot sequence, set up security measures, etc.

This conventional setup functionality is very limited. It is clumsy, error-prone, non-intuitive, and restrictive. It would be advantageous to provide a pre-boot interface mechanism that supports enhanced functionality while being more intuitive to improve the user experience and simplify system management.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIGS. 10a, 10b, and 10c respectively illustrate design information corresponding to exemplary element, complexType, and simpleType XML console schema objects;

DETAILED DESCRIPTION OF PREFERRED EMBODIMENTS

Embodiments of method to support XML-based consoles in pre-boot and post OS execution environments and apparatus for performing the method are described herein. In the following description, numerous specific details are set forth, such as embodiments implemented using the EFI framework, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
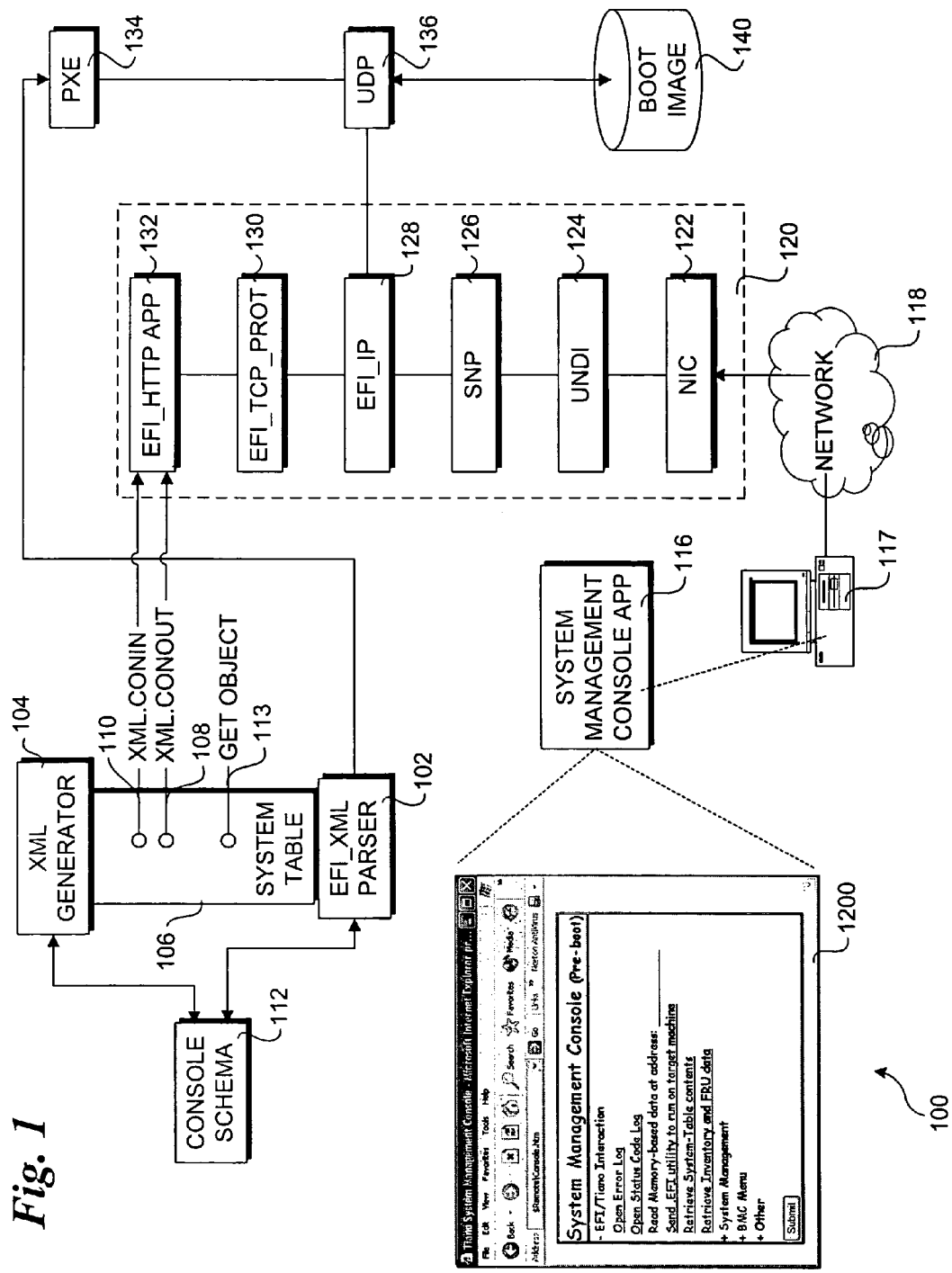
FIG. 1 is a schematic diagram illustrating an architecture for implementing an XML-based console in a pre-boot execution environment, according to one embodiment of the invention.

Embodiments are disclosed herein to enable support for XML-based consoles and the like during pre-boot operations. An XML-based console I/O (input/output) architecture 100 in accordance with one embodiment of the invention is shown in FIG. 1. Architecture 100 is implemented via an extensible firmware framework known as the Extensible Firmware Interface (EFI) framework (specifications and examples of which ma be found at http://developer.intel.com/technology/efi). EFI is a public industry specification that describes an abstract programmatic interface between platform firmware and shrink-wrap operation systems or other custom application environments. The EFI framework include provisions for extending BIOS functionality beyond that provided by the BIOS code stored in a platform's BIOS device (e.g., flash memory). More particularly, EFI enables firmware, in the form of firmware modules and drivers, to be loaded from a variety of different resources, including primary and secondary flash devices, option ROMs, various persistent storage devices (e.g., hard disks, CD ROMs, etc.), and even over computer networks. Further details of the EFI framework are discussed below.

At the heart of architecture 100 is an EFI XML parser 102, an XML generator 104, and an EFI system table 106 that includes XML-based console input (XML.ConIn) and console output (XML.ConOut) interfaces 108 and 110. The EFI XML parser 102 is used to parse XML documents structured in accordance with a console schema 112. A Get Object interface 113 is also provided to retrieve various system information and parameters.

In accordance with one aspect of architecture 100, a mechanism is provided to support administration of a system via a remote XML-based console, as depicted by a system management console 1200 rendered by a system management console application 116 running on a remote host 117. The remote host 117 is connected to the local system via a network 118. In turn, communications over network 118 are facilitated by a network stack 120 that includes a network interface controller (MC) 122, a universal network device interface (UNDI) 124, a simple network protocol (SNP) layer 126, and EFI Internet Protocol (IP) layer 128, an EFI Transmission Control Protocol (TCP) layer 130, and an EFI Hypertext Transport Protocol (HTTP) application 132.

Architecture 100 also includes components relating to system boot operations. These components include a PXE (pre-boot execution environment) driver 134, and a Universal Datagram Protocol (UDP) component 136. These components are used to retrieve boot components stored as a boot image 140.

Figure 2:
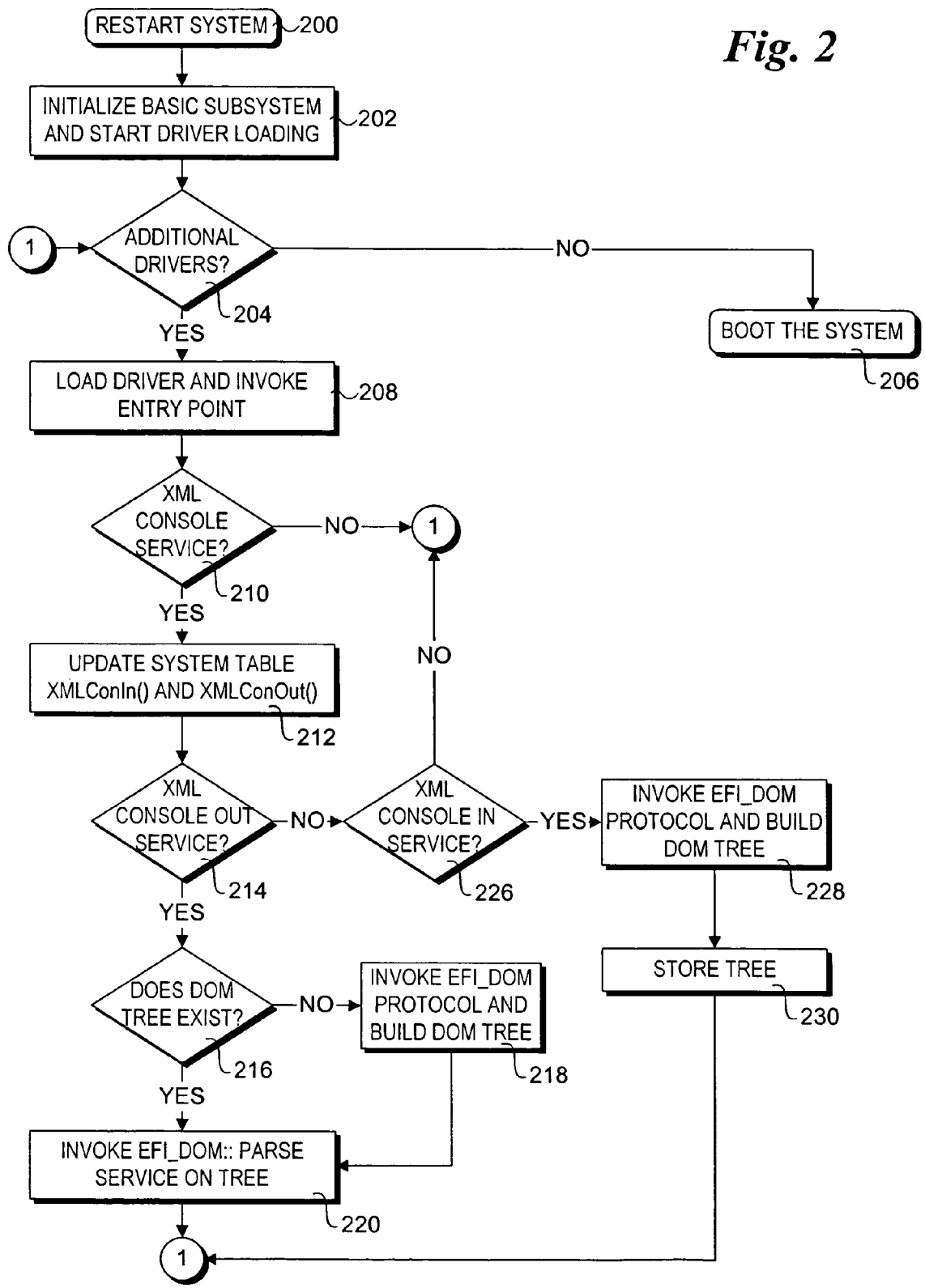
FIG. 2 is a flowchart illustrating operations and logic for configuring XML-based console services during a computer system pre-boot phase, according to one embodiment of the invention.

A flowchart illustrating operations and logic performed during the pre-boot phase of a computer system to support an XML-based console according to one embodiment are shown in FIG. 2. The process begins with a system restart event in a start block 200. In block 202, the basic firmware subsystem is initialized and driver loading is begun. Further details of this process for an EFI-based framework are discussed below with reference to FIGS. 3 and 4.

As depicted by a decision block 204, the following operations are performed for each driver that is loaded, until there are no more drivers to load, at which point the system is booted in a block 206. In a block 208, the driver is loaded and its entry point is invoked. A determination is then made in a decision block 210 to whether the driver is an XML console service. If it is, the EFI system table 106 is updated with the XML.ConIn( ) and XML.ConOut interfaces in a block 212. If not, the logic returns to entry point 1 to process the next driver.

Next, in a decision block 214 a determination is made to whether the XML console service is a console out service. The XML console out service is used for rendering content that is stored in a corresponding XML document or document(s) using XML schema definitions contained in console schema 112. If the answer to decision block 214 is YES, the logic proceeds to a decision block 216 in which a determination is made to whether a document object model (DOM) tree exists. If it does not, an EFI_DOM protocol is invoked in a block 218 to build the DOM tree. If the DOM tree exists, or otherwise once it is built, an EFI_DOM::Parse service is invoked using EFI_XML parser 102 on the DOM tree in a block 220. The logic then returns to entry point 1 to process the next driver.

Returning to decision block 214, if the answer is NO, a determination is made in a decision block 226 to whether the XML console service is a XML console in service. If so, the EFI_DOM protocol is invoked to build a DOM tree in a block 228. The tree is then stored for future use in a block 230, followed by a return to entry point 1.

Figure 3:
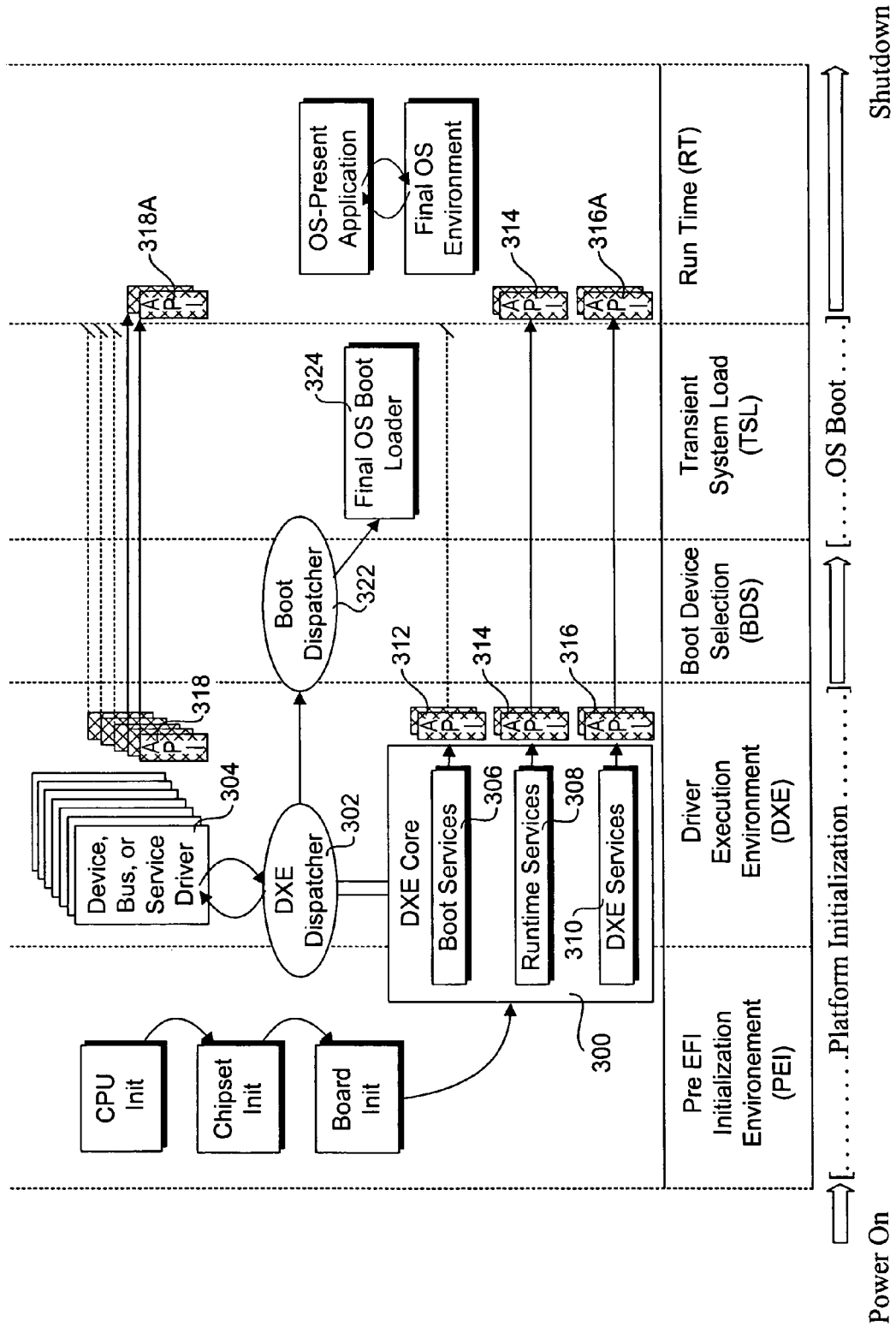
FIG. 3 is a schematic diagram illustrating the various execution phases that are performed in accordance with the extensible firmware interface (EFI) framework in response to a system restart.
Figure 4:
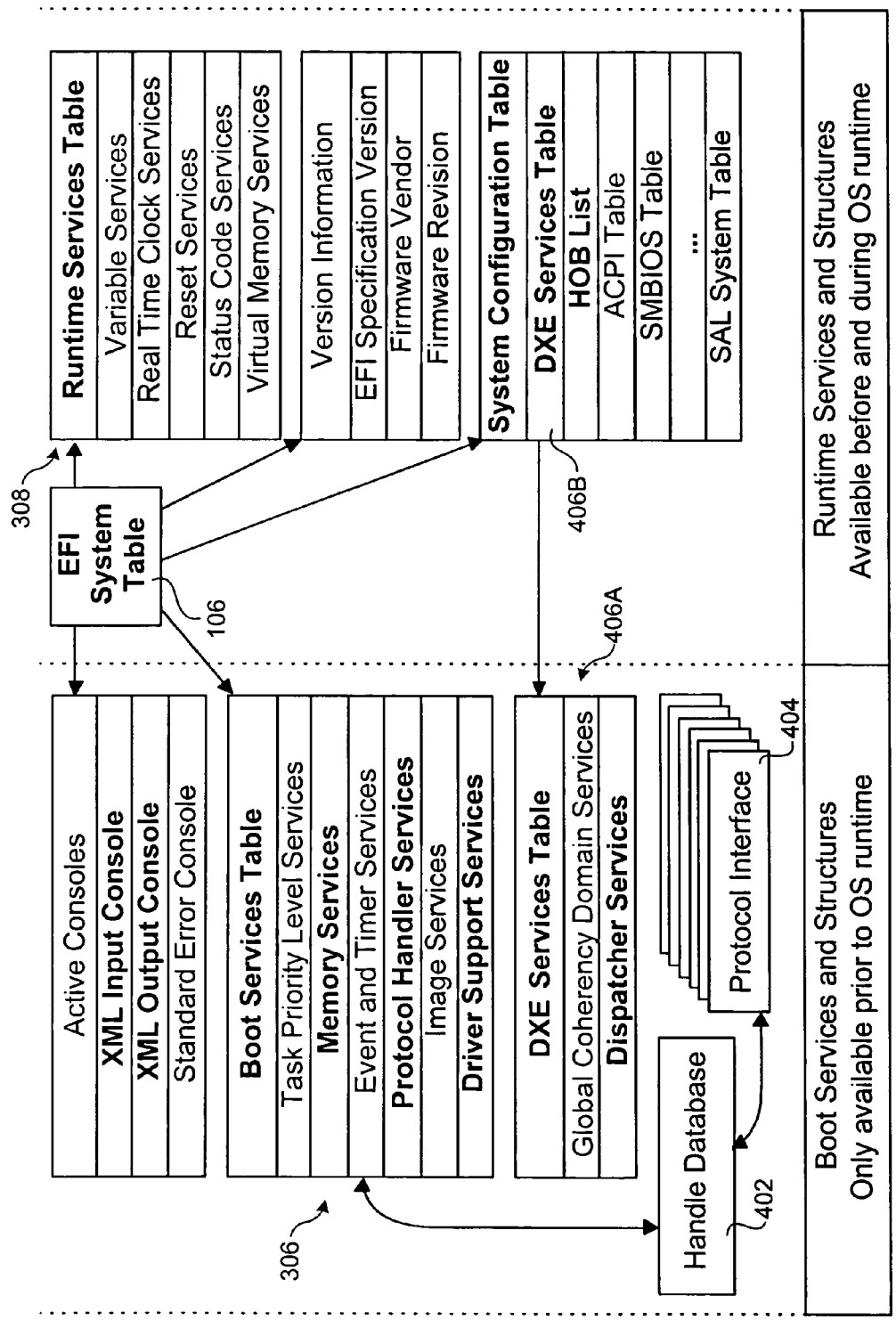
FIG. 4 is a block schematic diagram illustrating various components of the EFI system table that is configured and populated during the pre-boot phase.

Further details of one embodiment of the EFI framework are shown in FIGS. 3 and 4. FIG. 3 shows an event sequence/architecture diagram used to illustrate operations performed by a platform under the framework in response to a cold boot restart event (e.g., a power off/on reset). The process is logically divided into several phases, including a pre-EFI Initialization Environment (PEI) phase, a Driver Execution Environment (DXE) phase, a Boot Device Selection (BDS) phase, a Transient System Load (TSL) phase, and an operating system runtime (RT) phase. The phases build upon one another to provide an appropriate run-time environment for the OS and platform.

The PEI phase provides a standardized method of loading and invoking specific initial configuration routines for the processor (CPU), chipset, and motherboard. The PEI phase is responsible for initializing enough of the system to provide a stable base for the follow on phases. Initialization of the platforms core components, including the CPU, chipset and main board (i.e., motherboard) is performed during the PEI phase. This phase is also referred to as the "early initialization" phase. Typical operations performed during this phase include the POST (power-on self test) operations, and discovery of platform resources. In particular, the PEI phase discovers memory and prepares a resource map that is handed off to the DXE phase. The state of the system at the end of the PEI phase is passed to the DXE phase through a list of position independent data structures called Hand Off Blocks (HOBs).

The DXE phase is the phase during which most of the system initialization is performed. The DXE phase is facilitated by several components, including the DXE core 300, the DXE dispatcher 302, and a set of DXE drivers 304. The DXE core 300 produces a set of Boot Services 306, Runtime Services 308, and DXE Services 310. The DXE dispatcher 302 is responsible for discovering and executing DXE drivers 304 in the correct order. The DXE drivers 304 are responsible for initializing the processor, chipset, and platform components as well as providing software abstractions for console and boot devices. These components work together to initialize the platform and provide the services required to boot an operating system. The DXE and the Boot Device Selection phases work together to establish consoles and attempt the booting of operating systems. The DXE phase is terminated when an operating system successfully begins its boot process (i.e., the BDS phase starts). Only the runtime services and selected DXE services provided by the DXE core and selected services provided by runtime DXE drivers are allowed to persist into the OS runtime environment. The result of DXE is the presentation of a fully formed EFI interface.

The DXE core is designed to be completely portable with no CPU, chipset, or platform dependencies. This is accomplished by designing in several features. First, the DXE core only depends upon the HOB list for its initial state. This means that the DXE core does not depend on any services from a previous phase, so all the prior phases can be unloaded once the HOB list is passed to the DXE core. Second, the DXE core does not contain any hard coded addresses. This means that the DXE core can be loaded anywhere in physical memory, and it can function correctly no matter where physical memory or where Firmware segments are located in the processor's physical address space. Third, the DXE core does not contain any CPU-specific, chipset specific, or platform specific information. Instead, the DXE core is abstracted from the system hardware through a set of architectural protocol interfaces. These architectural protocol interfaces are produced by DXE drivers 304, which are invoked by DXE Dispatcher 302.

The DXE core produces an EFI System Table 106 and its associated set of Boot Services 306 and Runtime Services 308, as shown in FIG. 4. The DXE Core also maintains a handle database 402. The handle database comprises a list of one or more handles, wherein a handle is a list of one or more unique protocol GUIDs (Globally Unique Identifiers) that map to respective protocols 404. A protocol is a software abstraction for a set of services. Some protocols abstract I/O devices, and other protocols abstract a common set of system services. A protocol typically contains a set of APIs and some number of data fields. Every protocol is named by a GUID, and the DXE Core produces services that allow protocols to be registered in the handle database. As the DXE Dispatcher executes DXE drivers, additional protocols will be added to the handle database including the architectural protocols used to abstract the DXE Core from platform specific details.

The Boot Services comprise a set of services that are used during the DXE and BDS phases. Among others, these services include Memory Services, Protocol Handler Services, and Driver Support Services: Memory Services provide services to allocate and free memory pages and allocate and free the memory pool on byte boundaries. It also provides a service to retrieve a map of all the current physical memory usage in the platform. Protocol Handler Services provides services to add and remove handles from the handle database. It also provides services to add and remove protocols from the handles in the handle database. Addition services are available that allow any component to lookup handles in the handle database, and open and close protocols in the handle database. Support Services provides services to connect and disconnect drivers to devices in the platform. These services are used by the BDS phase to either connect all drivers to all devices, or to connect only the minimum number of drivers to devices required to establish the consoles and boot an operating system (i.e., for supporting a fast boot mechanism). In contrast to Boot Services, Runtime Services are available both during pre-boot and OS runtime operations.

The DXE Services Table includes data corresponding to a first set of DXE services 406A that are available during pre-boot only, and a second set of DXE services 406B that are available during both pre-boot and OS runtime. The pre-boot only services include Global Coherency Domain Services, which provide services to manage I/O resources, memory mapped I/O resources, and system memory resources in the platform. Also included are DXE Dispatcher Services, which provide services to manage DXE drivers that are being dispatched by the DXE dispatcher.

The services offered by each of Boot Services 306, Runtime Services 308, and DXE services 310 are accessed via respective sets of API's 312, 314, and 316. The API's provide an abstracted interface that enables subsequently loaded components to leverage selected services provided by the DXE Core.

After DXE Core 300 is initialized, control is handed to DXE Dispatcher 302. The DXE Dispatcher is responsible for loading and invoking DXE drivers found in firmware volumes, which correspond to the logical storage units from which firmware is loaded under the EFI framework. The DXE dispatcher searches for drivers in the firmware volumes described by the HOB List. As execution continues, other firmware volumes might be located. When they are, the dispatcher searches them for drivers as well.

There are two subclasses of DXE drivers. The first subclass includes DXE drivers that execute very early in the DXE phase. The execution order of these DXE drivers depends on the presence and contents of an a priori file and the evaluation of dependency expressions. These early DXE drivers will typically contain processor, chipset, and platform initialization code. These early drivers will also typically produce the architectural protocols that are required for the DXE core to produce its full complement of Boot Services and Runtime Services.

The second class of DXE drivers are those that comply with the EFI 1.10 Driver Model. These drivers do not perform any hardware initialization when they are executed by the DXE dispatcher. Instead, they register a Driver Binding Protocol interface in the handle database. The set of Driver Binding Protocols are used by the BDS phase to connect the drivers to the devices required to establish consoles and provide access to boot devices. The DXE Drivers that comply with the EFI 1.10 Driver Model ultimately provide software abstractions for console devices and boot devices when they are explicitly asked to do so.

Any DXE driver may consume the Boot Services and Runtime Services to perform their functions. However, the early DXE drivers need to be aware that not all of these services may be available when they execute because all of the architectural protocols might not have been registered yet. DXE drivers should use dependency expressions to guarantee that the services and protocol interfaces they require are available before they are executed.

The DXE drivers that comply with the EFI 1.10 Driver Model do not need to be concerned with this possibility. These drivers simply register the Driver Binding Protocol in the handle database when they are executed. This operation can be performed without the use of any architectural protocols. In connection with registration of the Driver Binding Protocols, a DXE driver may "publish" an API by using the Install Configuration Table function. This published drivers are depicted by API's 318. Under EFI, publication of an API exposes the API for access by other firmware components. The API's provide interfaces for the Device, Bus, or Service to which the DXE driver corresponds during their respective lifetimes.

The BDS architectural protocol executes during the BDS phase. The BDS architectural protocol locates and loads various applications that execute in the pre-boot services environment. Such applications might represent a traditional OS boot loader, or extended services that might run instead of, or prior to loading the final OS. Such extended pre-boot services might include setup configuration, extended diagnostics, flash update support, OEM value-adds, or the OS boot code. A Boot Dispatcher 320 is used during the BDS phase to enable selection of a Boot target, e.g., an OS to be booted by the system.

During the TSL phase, a final OS Boot loader 322 is run to load the selected OS. Once the OS has been loaded, there is no further need for the Boot Services 306, and for many of the services provided in connection with DXE drivers 304 via API's 318, as well as DXE Services 406A. Accordingly, these reduced sets of API's that may be accessed during OS runtime are depicted as API's 316A, and 318A in FIG. 3.

In accordance with aspects of the embodiments disclosed herein, the pre-boot/boot framework of FIG. 3 may be implemented to host the architecture 100 of FIG. 1 to support XML-based consoles. The various components of architecture 100 may be embodied as DXE drivers and EFI applications, with interfaces (i.e., API's) made accessible via EFI system table 106. As a result, XML processing is enabled during the pre-boot phase, defining a mechanism for supporting rich visual content that may be configured to mirror consoles previously available only during OS runtime.

As discussed above, embodiments of the present invention support XML-based consoles. XML, a subset of the Standard Generalized Markup Language (SGML), is the universal format for data on the World Wide Web. Using XML, users can create customized tags, enabling the definition, transmission, validation, and interpretation of data between applications and between individuals or groups of individuals. XML is a complementary format to HTML and is similar to the Hypertext Markup Language (HTML), as both contain markup symbols to describe the contents of a page or file. A difference, however, is that HTML is primarily used to specify how the text and graphic images of a Web page are to be displayed or interacted with. XML does not have a specific application but can be designed for a wider variety of applications.

In accordance with the DOM building operations of blocks 218 and 228, an XML document is converted to an object model tree data structure comprising as a DOM tree. In general, this operation may be performed using one of many commercially available XML parsers; in one embodiment the XML parser is embodied as a firmware component corresponding to EFI XML parser 102.

Figure 5:
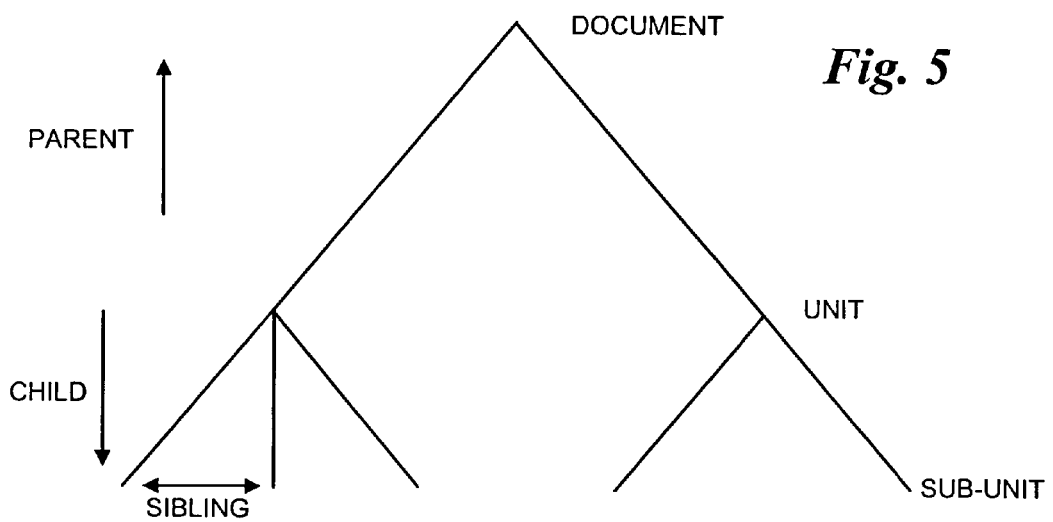
FIG. 5 is a schematic diagram illustrating a pictorial view of a document object model (DOM) tree.
Figure 6:
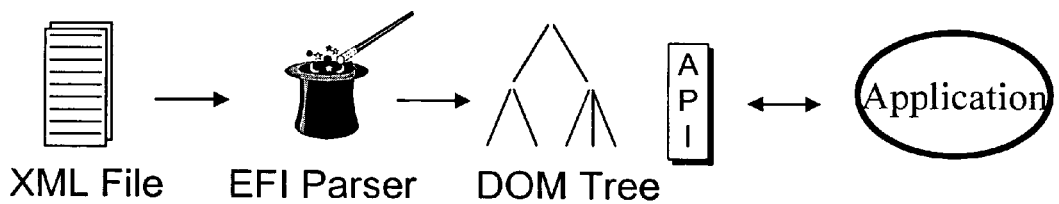
FIG. 6 is a schematic diagram pictorially illustrating processing and interactions between a XML file and an application
Figure 7:
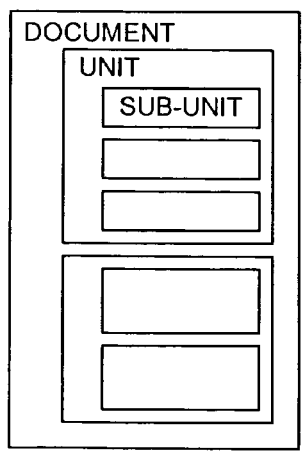
FIG. 7 is a schematic diagram illustrating the logical object hierarchy described by the DOM tree of FIG. 5.

In brief, an object model contains information pertaining to objects, along with properties of those objects. Such information is typically illustrated as a tree-like data structure comprising a plurality of nodes, wherein a parent node may have one or more child nodes, and the lowest level nodes are known as leaf nodes, such as shown in FIG. 5. This parallels the natural hierarchy of well-formed XML documents. As with HTML, XML documents comprise a plurality of XML elements defined by start- and end-tag pairs, wherein each XML element contains all of the data defined between its tags. This data may typically include other XML elements, such that XML elements may be nested within other XML elements. This creates a natural tree-like hierarchy, with parent-child relationships that are similar to those used in object models. For example, FIG. 5 shows an exemplary DOM tree architecture, while the corresponding object model hierarchy is depicted in FIG. 7. FIG. 6 pictorially illustrates operations to provide data contained in an XML document (i.e., file) to an application.

In accordance with the foregoing similarities between XML document structures and object models, the XML parser 102 generates a DOM tree by parsing the XML elements, extracting the inherent parent-child relationships and any corresponding data for each node. For example, XML documents typically contain a plurality of XML elements nested a various levels in the document's tree hierarchy, as defined by respective XML element start- and end-tag pairs. An object tree provides a logical representation of the components of a DOM tree that would result from parsing the XML of an XML document. Each object and any associated properties in an object tree representation is derived from a corresponding XML element in an XML listing, wherein the object's position in the object tree structure directly corresponds to the hierarchical position of its corresponding XML element in the XML listing. As will be recognized by those skilled in the XML arts, the actual DOM tree would provide additional information including interfaces that enable methods to manipulate the objects to which the interfaces correspond, as well as other DOM nodes and objects. These components of the DOM tree may or may not be used by the embodiments of the invention described herein, depending on the particularities of the implementation.

According to further aspects of this specification, XML schemas may be employed to support XML-based consoles. XML schemas are used to define datatypes and corresponding structures. Schemas are normally thought of in terms of databases. A schema is generally defined as the organization or structure of a database, and is often derived from a data model defining the structure and relationship between data elements. A schema typically comprises a structure using some sort of controlled vocabulary that names items of data, and lists any constraints that may apply (e.g., datatype, legal/illegal values, special formatting, etc.). The relationships between data items (the objects of data models) are also an important part of any schema.

In the context of XML, formal specifications for schemas are defined by the World Wide Web Consortium (W3C) organization. The three relevant specification documents include three parts: XML Schema Part 0: Partner, XML Schema Part 1: Structures, and XML Schema Part 2: Datatypes. The current versions of these specifications are respectively available at http://www.w3.org/TR/xmlschema-0/, http://www.w3.org/TR/xmlschema-1/, and http://www.w3.org/TR/xmlschema-2/, all dated May 2, 2001.

In one embodiment, console schema 112 comprises an XML schema that contains data object structure and relationship information including XML templates that are used to support system management consoles with a rich and intuitive user interface during the pre-boot phase. In one embodiment, the console interface mirrors a console interface that is available during the OS runtime. Furthermore, in one embodiment, another similar interface is available even after an OS has failed.

In one embodiment, a browser-based interface is provided during the pre-boot to facilitate the look and feel of the system management console available during OS runtime. For example, the most recent version of Microsoft Windows operating system, Windows XP, provides a single common browser interface for viewing each of Web content, file management, and system settings. This interface gathers information and generates corresponding content XML and sends the content to a local receiver (for local admin consoles), or a remote receiver via an appropriate transport over a computer network. Upon receiving the content, it can be rendered using by a console host application that includes a browser.

Figure 8:
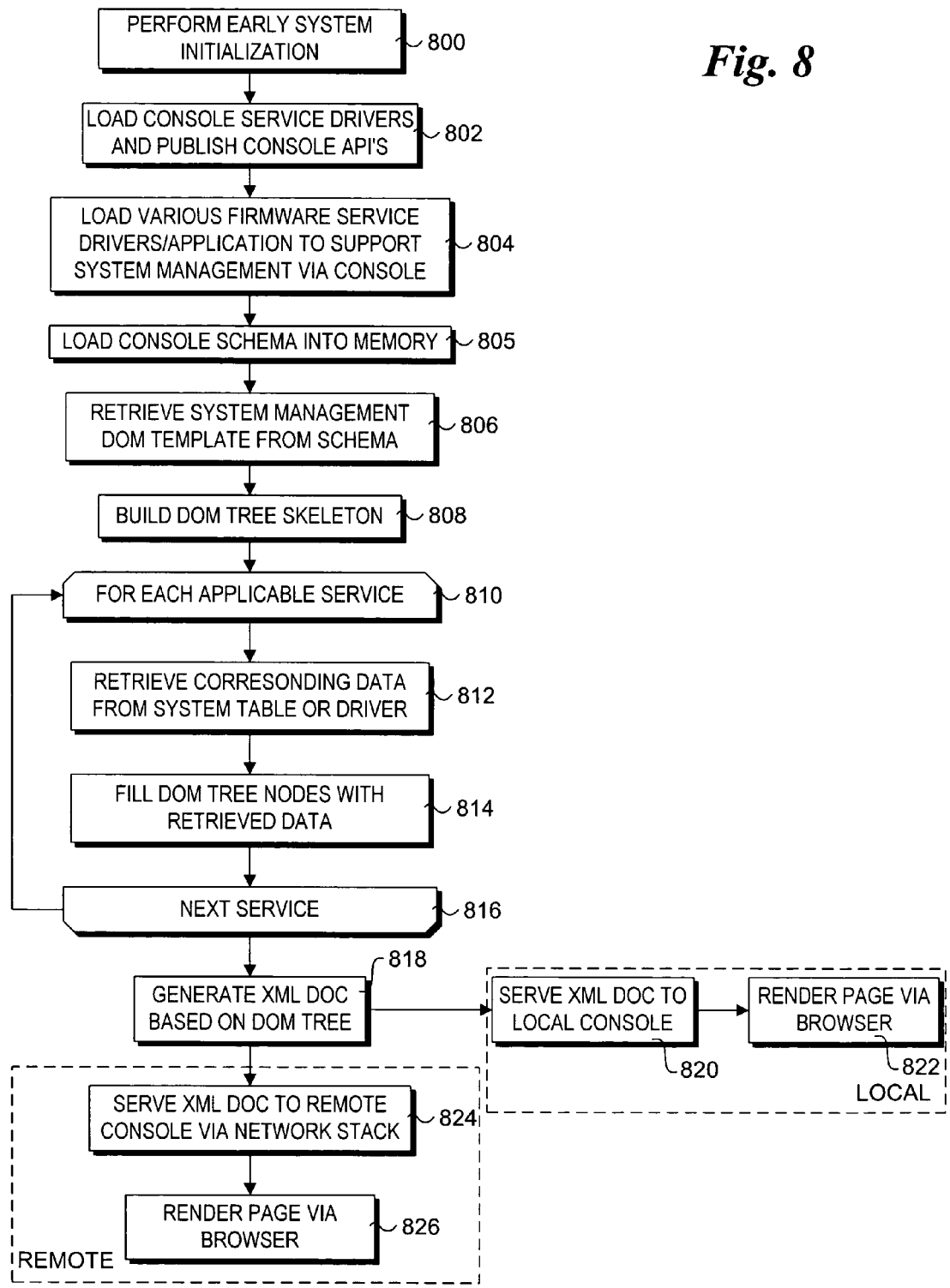
FIG. 8 is a flowchart illustrating logic and operations for building an initial XML document used to build an XML-based console user interface via which system management operations may be effectuated during the pre-boot of a computer system, according to one embodiment of the invention.
Figure 9:
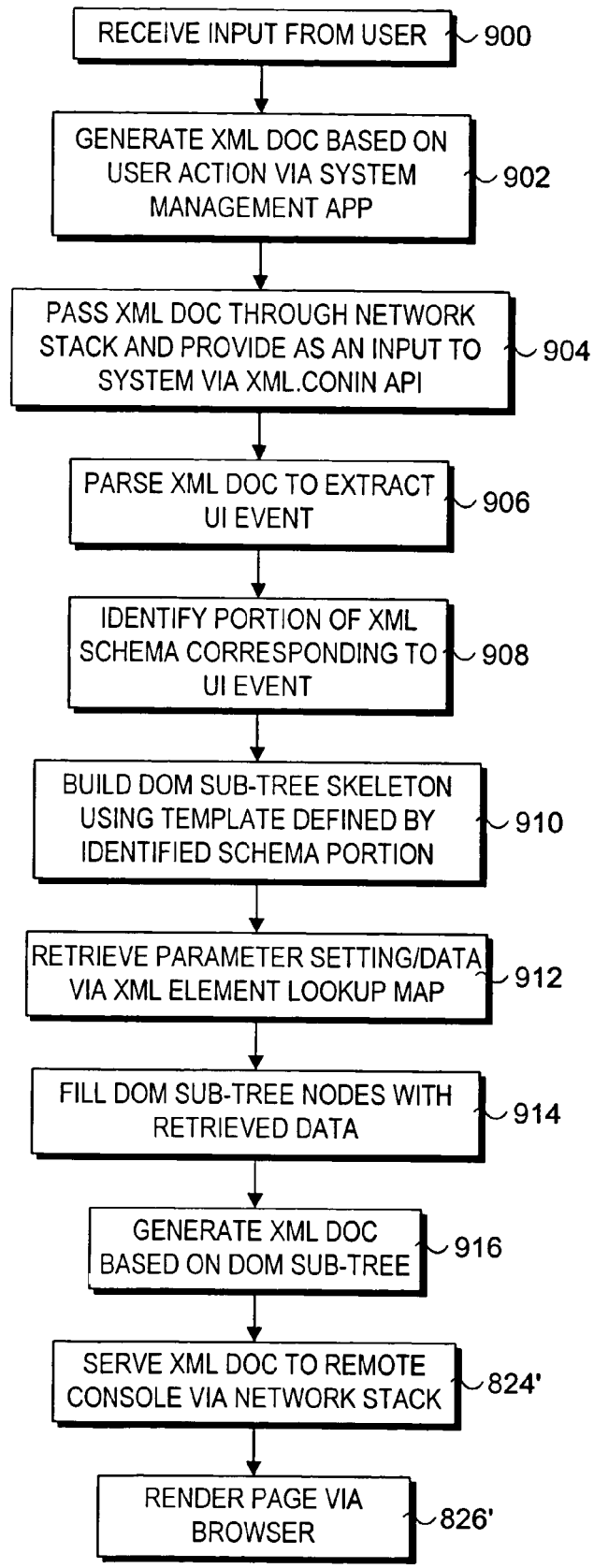
FIG. 9 is a flowchart illustrating logic and operations for dynamically generating XML content in response to a menu selection event effectuated through the console user interface generated by the process of FIG. 8.

In one embodiment, XML content is generated using a two-phase process. The first phase, depicted in FIG. 8, is used to build an initial XML document that is static. The second phase, depicted in FIG. 9, is used to dynamically update the initial XML document in response to user request entered via a remote or local instance of system admin console 116.

The process of FIG. 8 is generally initiated in response to a restart or reset event. As is conventionally done, early system initialization is performed in a block 800. Subsequently, firmware drivers begin to load, as described above with reference to FIG. 3. In a block 802, the console service drivers are loaded, and the XML.ConIn and XML.ConOut API's are published. Also during the driver load phase, various firmware service drivers and applications that are used to support system management via the console are loaded, as depicted in a block 804.

The next set of operations depicted in blocks 806-818 relates to generating the initial XML document. The process begins in a block 806, in which a system management DOM template is retrieved from console schema 112. In general, smaller console schemas may be stored in a non-persistent store (e.g., a firmware store), while larger console schemas will typically be retrieved from a mass storage device and loaded into system memory. In one embodiment, the console schema may be loaded into memory from a network store.

The DOM template defines a DOM tree structure that is used to build a skeletal tree in a block 808. In one embodiment, the skeletal tree mirrors the menu structure of the console, with each menu branch and sub-branch occupying respective DOM branch and sub-branch objects. The reason for the "skeletal" reference is because at this point in time the DOM tree only contains menu elements, with no data elements pertaining to system objects.

Dom tree information may be derived from the console schema. The console schema provides a plurality of object definitions and the relationships to other objects. The schema itself is an XML document comprises a nested hierarchy of objects.

In one embodiment, the console schema 112 includes three types of XML elements: elements, complexType elements, and simpleType elements. Design information corresponding to these respective console schema 112 elements types are shown in FIGS. 10a-c.

Figure 10A:

Design information corresponding to an exemplary schema element type is shown in FIG. 10a. The design information includes a Diagram section 1000, a namespace section 1002, a datatype 1004, a used by section 1006, and annotation section 1008, and a source section 1010. The diagram section contains a diagram for the corresponding object design. In this instance, it contains a single object corresponding to a Hard disk drive. The namespace section 1002 prescribed the namespace for the XML source. The Type section 1004 defines the type of the object data; in this case, it is a string. The used by section 1006 contains cross-references to other objects that contain the element. In this example, this include a pair of complexType elements: BootHardDIskDrivers001Base and BoodHardDiskDrivers001Type. The annotation section 1008 contains a documentation annotation for the element. The source section 1010 contains a source listing template for the element.

As shown in the exemplary complexType element design information of FIG. 10b, a complexType element includes a hierarchy of objects, beginning with the inherent object as the top level parent, and one or more child objects. The datatype section 1004 defines a restriction specifying a reference to the type as being of bios:BootHardDiskDrives001Base; this underlying type is defined elsewhere in a separate type definition document portion of the console schema. A children section 1012 is provided to specify the children of the complexType element. An attributes section 1014 is used to specify attributes for the element.

As its name implies, a simpleType element is the most basic type of element. A simpleType definition comprises a set of constraints on the value space and the lexical space of a datatype. As shown in FIG. 10c, an exemplary FloppyConfigurationTypes simpleType element includes a namespace section 1002, a datatype section 1004, a used by section 1006 and a source section 1010, each of which contain data similar to like-named sections discussed above. In the illustrated embodiment, the design data further include a facets section 1016 in which one or more constraining facets are listed, such as the enumerated floppy drive configuration types shown in the Figure.

The structural element portion of console schema 112 is generated based on design information for the various schema elements. The final result is a very large XML document. The XML text in the schema reflects the listings contained in the various source sections 1010 for the overall design. The level of nesting of these template source sections is based on the hierarchy specified in the diagram (or otherwise may be derived from the children section 1012 section. One of the objects in the console schema corresponds to the system management DOM template discussed above.

Returning to the flowchart of FIG. 8, the operations in the loop defined by start and end loop blocks 810 and 816 are used to populate the skeletal DOM tree with data elements. For each applicable service for which static system data and snapshots of dynamic system data may be derived, corresponding data is retrieved in a block 812. Appropriate DOM tree nodes are then filled with the retrieved data in a block 814. In one embodiment, the operations of blocks 812 and 814 are performed in conjunction with loading the respective service components. In another embodiment, the various data may be temporarily stored in a pre-configured data structure, wherein the DOM tree nodes are filled by retrieving data from the data structure in one operations rather than iteratively as depicted in FIG. 8.

After the DOM tree nodes have been filled, the initial XML document is generated in a block 818. The XML document is then served to a local console and rendered by a browser, as depicted by blocks 820 and 822, or sent to a remote console host via network stack 120 and rendered by a browser in accordance with blocks 824 and 826.

In general, XML documents are not directly rendered, but are rather typically provided to a browser as embedded content. Depending on the particular implementation, this initial XML document may be embedded in a larger document suitable for rendering, such as an HTML-based document. For example, in one embodiment system management console application 116 running on remote host 117 is used to generate renderable page content based on the XML content passed to it. In another embodiment, the system management console application may run as an EFI application on the local system. As a result, only the initial XML document needs to be passed to the system management console application instance, which in turn will generate HTML content from which console user interface (UI) pages may be rendered by a browser or a like.

Figure 11:
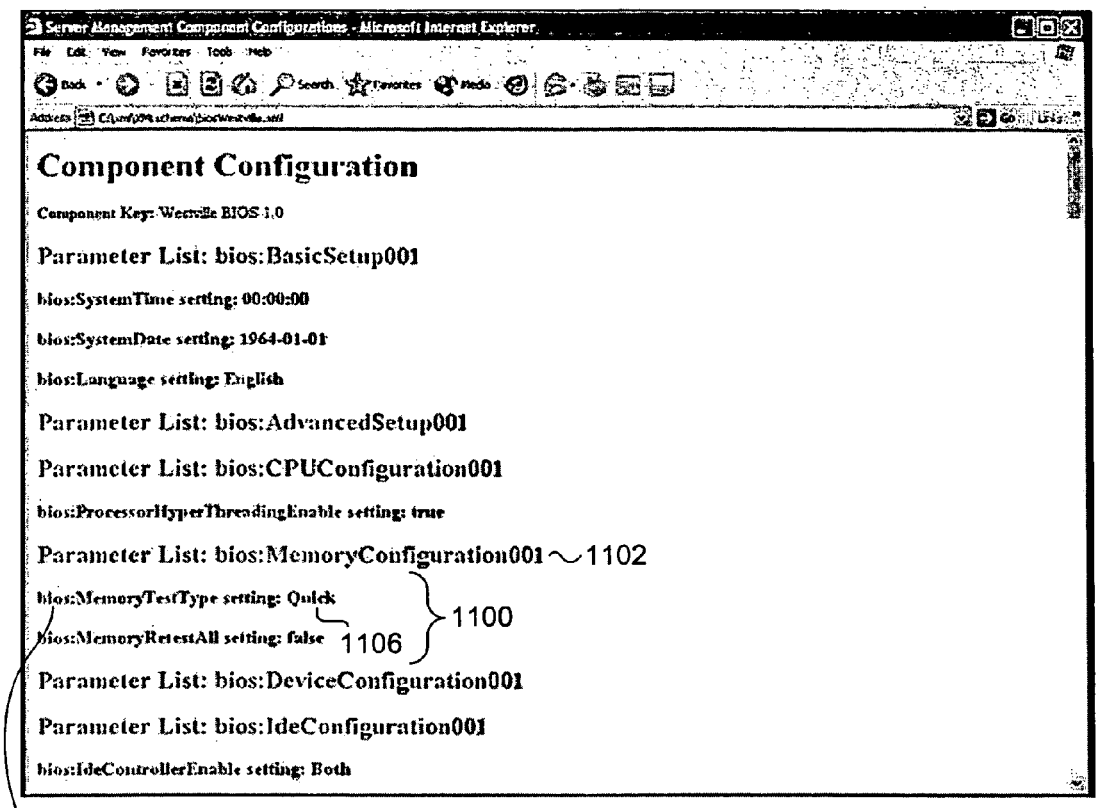
FIG. 11 is a representation of an exemplary system management console user interface screen corresponding to a component configuration menu selection.

A portion of an exemplary component configuration page included setting details for various system components is shown in FIG. 11. In accordance with the console schema and current menu navigation location within the schema, a list of component objects are rendered, such as a parameter list 1100 for a corresponding bios:MemoryConfiguration001object 1102. Each item in the parameter list includes a parameter name 1104 and a parameter setting 1106. For example, the setting for the parameter "bios:MemoryTestType" is "Quick." As with conventional web pages, the content for a given page may include objects that are not visible unless the page is scrolled to those objects.

One advantage of using a remote console is that the remote console UI may be generated using operating system runtime facilities that are yet to be available during the pre-boot. Thus, the firmware footprint may be reduced. On the flip side, a local implementation will not require network stack 120, although it is possible to employ the network stack to serve to a local system by directing the XML content to an internal destination rather than an external network address.

Figure 12:
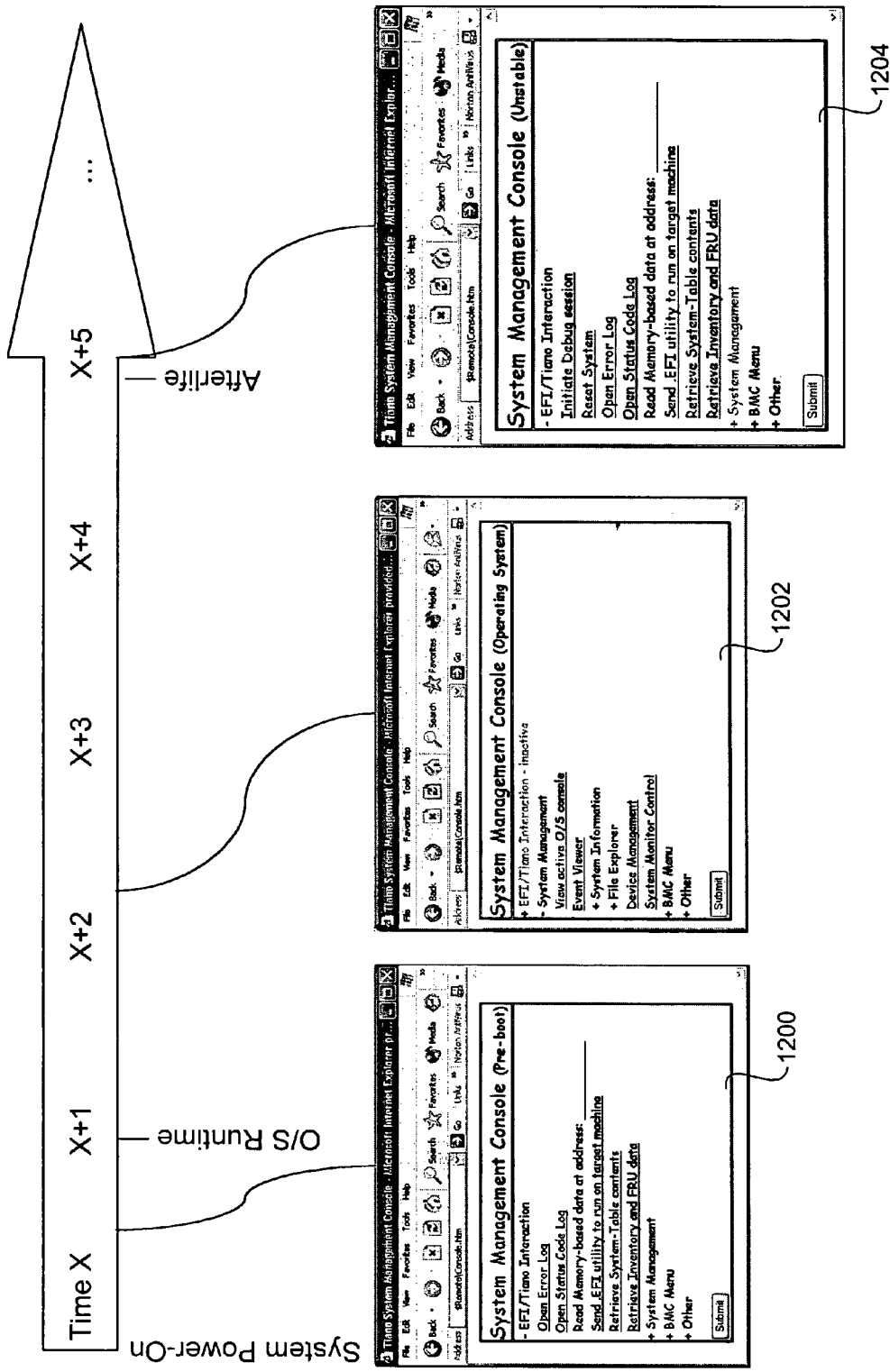
FIG. 12 is a schematic diagram illustrating an XML-based system management console user interface that may be implemented across different execution regimes while presenting a common user experience, including pre-boot, operating system runtime, and OS afterlife.

The initial XML doc is used to facilitate rendering of a system management menu UI, such as shown in a page 1200 of FIG. 12. The system management menu is configured in a tree-like hierarchy (mapped to the XML DOM trees), and includes the previously retrieved XML DOM tree node data at various node levels in the menu. Clicking on various menu objects will cause portions of the menu to expand or contract, with expanded objects containing addition menu options and/or displaying system data provided via the initial XML document. An exemplary page corresponding to a Component Configuration menu option is shown in FIG. 11.

As discussed above, the second phase of the console generation process depicted in FIG. 9 pertains to dynamic access of system management data. For example, various system data objects may change throughout the pre-boot. These include error logs, status code logs, memory data, EFI system table contents, etc. As a result, it is advantageous to dynamically update the system admin console UI so that it may display the current data values. This is accomplished, in large part, by retrieving selected data via an appropriate service, and then dynamically updating the XML document content. The console generation process illustrated in FIG. 9 relates to operations and activities that are employed when using a remote console. It will be understood that similar operations and activities (albeit, absent the networking stack in one embodiment) would be performed when using a local console.

A typical dynamic remote console update process begins in a block 900, wherein a user input is received. For example, the user may click on a menu item to expand a menu or retrieve information identified by that menu item. In response, and XML document based on the user interaction is generated in a block 902. In one embodiment, a system management application is used to form an interface between the system management UI and user inputs, converting such inputs into corresponding XML documents. In one embodiment, the XML documents comprise XML elements corresponding to a DOM sub-tree from which the menu option was originally built.

In a block 904 the XML document is sent to the system via network 118 and passed through network stack 120, eventually being provided as an input to the pre-boot environment via the XML.ConIn API 110. The XML document is then parsed by the EFI XML parser 102 in a block 906 to extract the UI event.

In a block 908, a portion of the XML schema corresponding to the extracted UI event is identified. For example, the UI event may correspond to a user selection to view system component configuration data. Thus, the first set of XML content passed to the XML parser might including a <element: component configuration/> element, which is extracted. At the same time, a portion of the XML schema would pertain to the component configuration element; this portion would be identified in block 908.

Next, in a block 910 a DOM sub-tree skeleton is build using the template defined by the portion of the schema that is identified in block 908. The DOM sub-tree template will typically comprise a skeletal sub-tree that may include objects such as menu text and/or display text. The configuration for the sub-tree will generally depend on the corresponding XML source listing. For example, the event may relate to opening an error log or a status code log. In this case, the DOM sub-tree will be configured in a manner corresponding to how the error or status code log is to be presented. In other instances, the data to be returned may be presented in a more complex manner, such as via a collection of sub-menus containing corresponding data elements. For example, this could be applicable to a situation in which the menu selection event sought to return the EFI system table contents.

In a block 912 settings and/or other data corresponding to the Dom sub-tree is retrieved via an XML element lookup map. In one embodiment, this is enabled by the by get object interface 113. The element lookup map comprises a lookup table (i.e., a namespace) that maps XML elements to corresponding addresses in which the settings for those respective XML elements are stored. For example, the lookup table may contain a list of XML element keywords, such as "com1enable, "com1address," etc., and corresponding address offsets at which settings for the elements are stored.

After the settings data are retrieved, the DOM sub-tree nodes are populated with the retrieved data in a block 914. A corresponding XML document is next generated based on the DOM sub-tree in a block 916. At this point, the XML document is returned to the remote console via operations performed in blocks 824' and 826', which mirror the operations discussed above for blocks 824 and 826 in FIG. 8.

Thus, the embodiments of FIGS. 8 and 9 enable a user of a remote or local system administration console application 116 instance to view and manage various system parameters and data of a local computer system while the system is operating in a pre-boot execution environment. The system administration console provides a rich interface that heretofore has not been available during the pre-boot, providing an intuitive user experience. Furthermore, the data displayed on the console may be dynamically updated to reflect the current state of the local computer system.

Embodiments of the invention provide system management console functionality that mirror that is generally associated with OS runtime consoles. In one embodiment, a common system management application running on a remote host may be employed to provide for a system management console interface during both pre-boot and OS runtime. Not only this, but in one embodiment the same console interface is supported during an OS afterlife phase, such as after an operating system has crashed. This provides enhanced debug access that formerly would have required the system to be re-booted at the very least. Respective system console UI's 1200, 1202, and 1204 corresponding to the pre-boot phase, OS runtime phase, and OS afterlife phase are shown in FIG. 12.

Figure 13:
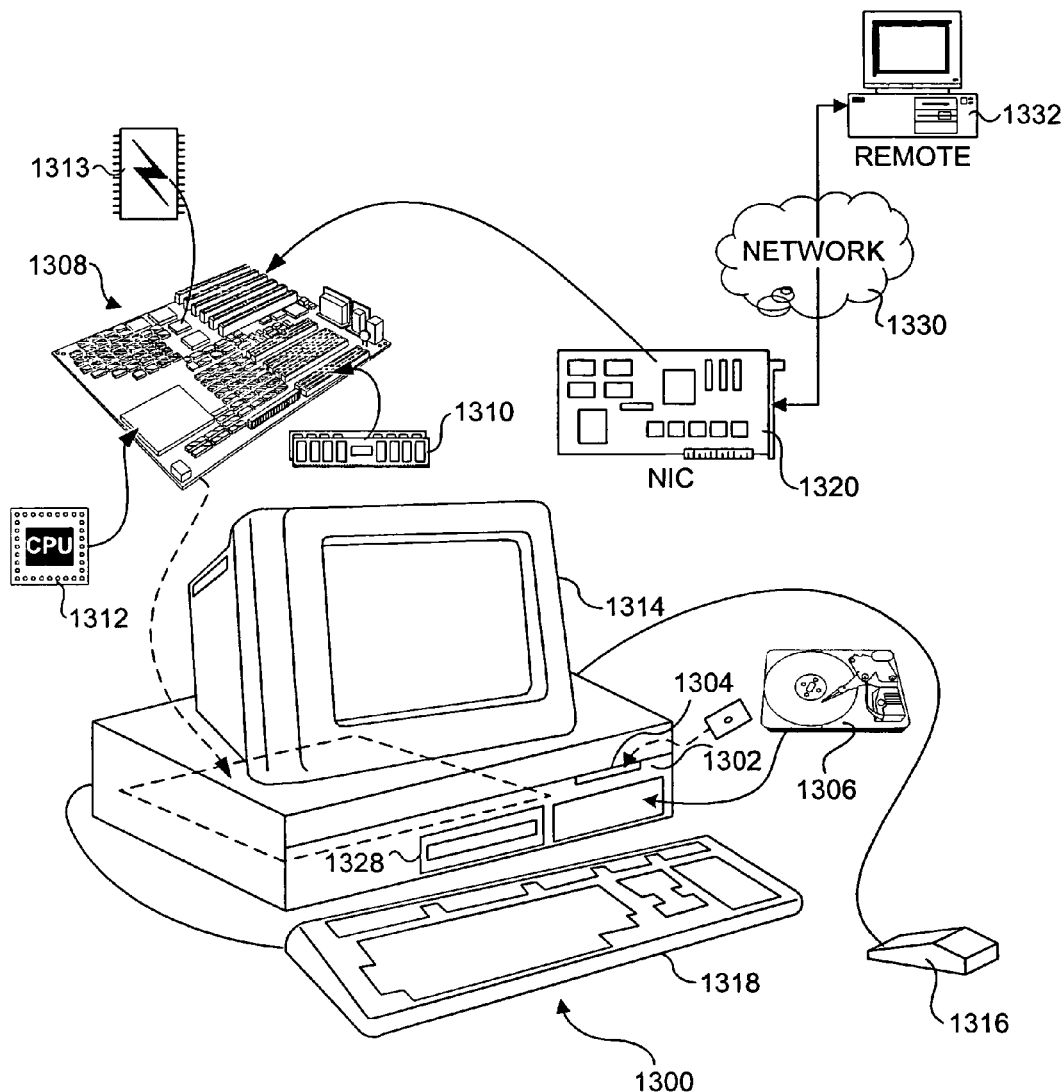
FIG. 13 is a schematic diagram illustrating an exemplary computer system on which aspects of the embodiments described herein may be practiced.

FIG. 13 illustrates an embodiment of an exemplary computer system 1300 to practice embodiments of the invention described above. Computer system 1300 is generally illustrative of various types of computer devices, including personal computers, laptop computers, workstations, servers, etc. For simplicity, only the basic components of the computer system are discussed herein. Computer system 1300 includes a chassis 1302 in which various components are housed, including a floppy disk drive 1304, a hard disk 1306, a power supply (not shown), and a motherboard 1308. Hard disk 1306 may comprise a single unit, or multiple units, and may optionally reside outside of computer system 1300. The motherboard 1308 includes memory 1310 coupled in communication with one or more processors 1312 via appropriate busses and/or chipset components. Memory 1310 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. Processor 1312 may be a conventional microprocessor including, but not limited to, a CISC (complex instruction set computer) processor, such as an Intel Corporation x86, Pentium®, or Itanium® family microprocessor, a Motorola family microprocessor, or a RISC (reduced instruction set computer) processor, such as a SUN SPARC processor or the like.

The computer system 1300 also includes one or more non-volatile memory devices on which firmware for effectuating all or a portion of the XML-based console services is stored. Such non-volatile memory devices include a flash device 1313. Other non-volatile memory devices include, but are not limited to, an Erasable Programmable Read Only Memory (EPROM), an Electronically Erasable Programmable Read Only Memory (EEPROM), or the like. The computer system 1300 may include other firmware devices as well (not shown).

A monitor 1314 is included for displaying graphics and text generated by firmware, software programs and program modules that are run by computer system 1300, such as the system management consoles described above. A mouse 1316 (or other pointing device) may be connected to a serial port, USB (Universal Serial Bus) port, or other like bus port communicatively coupled to processor 1312. A keyboard 1318 is communicatively coupled to motherboard 1308 in a similar manner as mouse 1316 for user entry of text and commands. In one embodiment, computer system 1300 also includes a network interface card (NIC) 1320 or built-in NIC interface (not shown) for connecting computer system 1300 to a computer network 1330, such as a local area network (LAN), wide area network (WAN), or the Internet. In one embodiment, network 1330 is further coupled to a remote computer 1132, such that computer system 1300 and remote computer 1332 can communicate. In one embodiment, a portion of the computer system's firmware and/or pre-boot environment data is loaded during system boot from remote computer 1332. For example, data corresponding to console schema 112 may be stored on remote computer 1332 and loaded into memory 1310 during the pre-boot. In one embodiment, system management console application 116 is embodied as an EFI application that is loaded from remote computer 1332 into memory 1310.

Computer system 1300 may also optionally include a compact disk-read only memory ("CD-ROM") drive 1328 into which a CD-ROM disk may be inserted so that executable files, such as an operating system, and data on the disk can be read or transferred into memory 1310 and/or hard disk 1306. Other mass memory storage devices may be included in computer system 1300.

In another embodiment, computer system 1300 is a handheld or palmtop computer, which are sometimes referred to as Personal Digital Assistants (PDAs). Handheld computers may not include a hard disk or other mass storage, and the executable programs are loaded from a corded or wireless network connection into memory 1310 for execution by processor 1312. A typical computer system 1300 will usually include at least a processor 1312, memory 1310, and a bus (not shown) coupling the memory 1310 to the processor 1312.

It will be appreciated that in one embodiment, computer system 1300 is controlled by operating system software that includes a file management system, such as a disk operating system, which is part of the operating system software. For example, one embodiment of the present invention utilizes a Microsoft Windows® operating system for computer system 1300. In another embodiment, other operating systems such as, but not limited to, an Apple Macintosh® operating system, a Linux-based operating system, the Microsoft Windows CE® operating system, a Unix-based operating system, the 3Com Palm® operating system, or the like may also be use in accordance with the teachings of the present invention.

Thus, embodiments of this invention may be used as or to support a firmware and software code executed upon some form of processing core (such as processor 1312) or otherwise implemented or realized upon or within a machine-readable medium. A machine-readable medium includes any mechanism that provides (i.e., stores and/or transmits) information in a form readable by a machine (e.g., a computer, network device, personal digital assistant, manufacturing tool, any device with a set of one or more processors, etc.). In addition to recordable media, such as disk-based media, a machine-readable medium may include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
   loading an XML (eXtended Markup Language) console interface during a pre-boot phase of a computer system;
   enabling a user to perform system management operations during the pre-boot phase by passing XML content between the computer system and a first system management console host application via the XML-based console interface;
   enabling the user to perform system management operations during an operating system runtime phase by passing XML content between the computer system and a second system management console host application via the XML-based console interface, the second system management console host application operating during the operating system runtime phase; and
   enabling the user to perform system management operations during an operating system afterlife phase by passing XML content between the computer system and the first system management console host application via the XML-based console interface.

2. The method of claim 1, further comprising:
   running the first system management console host application on a remote computer system; and
   transmitting the XML content via a network to which the computer system and the remote computer system are coupled.

3. The method of claim 1, further comprising running the first system management console host application on the computer system.

4. The method of claim 1, further comprising:
   storing template information in an XML schema;
   identifying a portion of the XML schema corresponding to a menu selection event made by a user via the system management console host application; and
   generating XML content formatted according to the template information defined by the portion of the XML schema that is identified.

5. The method of claim 4, further comprising loading the XML schema into memory for the computer system from a local mass storage device during the pre-boot phase.

6. The method of claim 4, further comprising loading the XML schema into memory for the computer system from a remote network store during the pre-boot phase.

7. The method of claim 1, further comprising:
generating an initial set of XML content containing system management data pertaining to initial system configuration information; and
processing the initial set of XML content to generate browseable system management content that may be selectively displayed via the first and second system management console host application.

8. The method of claim 7, further comprising:
receiving a menu selection input from a user via at least one of the first and the second system management console host application;
generating a first set of XML content indicative of the menu selection input;
sending the first set of XML content to an XML parser;
extracting the menu selection input via the XML parser;
retrieving system management data pertaining to the menu selection input;
dynamically generating a second set of XML content containing the system management data;
passing the second set of XML content back to the respective system management console host application; and
rendering an updated XML-based console interface containing the system management data.

9. The method of claim 1, wherein the method is implemented using firmware components configured in accordance with the extensible firmware interface (EFI) framework standard.

10. A machine-readable non-transitory storage medium to provide instructions, which when executed perform operations including:
loading an XML (eXtended Markup Language) console interface during a pre-boot phase of a computer system;
enabling a user to perform system management operations during the pre-boot phase by passing XML content between the computer system and a first system management console host application via the XML-based console interface;
enabling the user to perform system management operations during an operating system runtime phase by passing XML content between the computer system and a second system management console host application via the XML-based console interface, the second system management console host application operating during the operating system runtime phase; and
enabling the user to perform system management operations during an operating system afterlife phase by passing XML content between the computer system and the first system management console host application via the XML-based console interface.

11. The machine-readable non-transitory storage medium of claim 10, wherein the first system management console host application is included on a remote computer system, the operations to be performed further comprising transmitting the XML content via a network to which the computer system and the remote computer system are coupled.

12. The machine-readable non-transitory storage medium of claim 10, the operations to be performed further comprising running the first system management console host application.

13. The machine-readable non-transitory storage medium of claim 10, the operations to be performed further comprising:
storing template information in an XML schema;
identifying a portion of the XML schema corresponding to a menu selection event made by a user via the system management console host application;
generating XML content formatted according to the template information defined by the portion of the XML schema that is identified.

14. The machine-readable non-transitory storage medium of claim 10, the operations to be performed further comprising:
generating an initial set of XML content containing system management data pertaining to initial system configuration information;
processing the initial set of XML content to generate browseable system management content that may be selectively displayed via the first and second system management console host application;
receiving a menu selection input from a user via at least one of the first and the second system management console host application;
generating a first set of XML content indicative of the menu selection input;
sending the first set of XML content to an XML parser;
extracting the menu selection input via the XML parser;
retrieving system management data pertaining to the menu selection input;
dynamically generating a second set of XML content containing the system management data;
passing the second set of XML content back to the respective system management console host application; and
rendering an updated XML-based console interface containing the system management data.

15. A computer system comprising:
a processor;
memory, communicatively coupled to the processor; and
at least one storage device communicatively coupled to the processor and having instructions stored thereon, which when executed by the processor perform operations including
loading an XML (eXtended Markup Language) console interface during a pre-boot phase of a computer system,
enabling a user to perform system management operations during the pre-boot phase by passing XML content between the computer system and a first system management console host application via the XML-based console interface,
enabling the user to perform system management operations during an operating system runtime phase by passing XML content between the computer system and a second system management console host application via the XML-based console interface, the second system management console host application to operate during the operating system runtime phase, and
enabling the user to perform system management operations during an operating system afterlife phase by passing XML content between the computer system and the first system management console host application via the XML-based console interface.

16. The system of claim 15, wherein the first system management console host application is included on a remote computer system, the operations to be performed further comprising transmitting the XML content via a network to which the computer system and the remote computer system are coupled.

17. The system of claim 15, the operations to be performed further comprising running the first system management console host application.

18. The system of claim 15, the operations to be performed further comprising:
   storing template information in an XML schema;
   identifying a portion of the XML schema corresponding to a menu selection event made by a user via the system management console host application; and
   generating XML content formatted according to the template information defined by the portion of the XML schema that is identified.

19. The system of claim 15, the operations to be performed further comprising:
   generating an initial set of XML content containing system management data pertaining to initial system configuration information;
   processing the initial set of XML content to generate browseable system management content that may be selectively displayed via the first and second system management console host application;
   receiving a menu selection input from a user via at least one of the first and the second system management console host application;
   generating a first set of XML content indicative of the menu selection input;
   sending the first set of XML content to an XML parser;
   extracting the menu selection input via the XML parser;
   retrieving system management data pertaining to the menu selection input;
   dynamically generating a second set of XML content containing the system management data;
   passing the second set of XML content back to the respective system management console host application; and
   rendering an updated XML-based console interface containing the system management data.

* * * * *